United States Patent [19]
Tanaka et al.

[11] Patent Number: 5,337,447
[45] Date of Patent: Aug. 16, 1994

[54] GROMMET

[75] Inventors: Toshiharu Tanaka; Syunji Kitoh, both of Yokkaichi, Japan

[73] Assignee: Sumitomo Wiring Systems, Ltd., Yokkaichi, Japan

[21] Appl. No.: 985,035

[22] Filed: Dec. 3, 1992

[30] Foreign Application Priority Data

Dec. 3, 1991 [JP] Japan .................. 3-99532[U]

[51] Int. Cl.$^5$ .................. B65D 55/00; H01B 17/26
[52] U.S. Cl. ...................... 16/2; 174/153 G
[58] Field of Search ............ 16/2; 174/65 G, 152 G, 174/153 G

[56] References Cited

U.S. PATENT DOCUMENTS

| | | |
|---|---|---|
| 4,839,937 | 6/1989 | Oikawa et al. |
| 4,912,287 | 3/1990 | Ono et al. |
| 4,928,349 | 5/1990 | Oikawa et al. |
| 5,144,777 | 9/1992 | Fishel et al. ............ 16/2 |

Primary Examiner—Carmine Cuda
Attorney, Agent, or Firm—Sughrue, Mion, Zinn, Macpeak & Seas

[57] ABSTRACT

A grommet including an elastic grommet body and a clamp, the grommet body having a cylindrical portion for closely receiving an outer periphery of a wire bundle, a flange provided at one end of the cylindrical portion, an annular groove formed on an inner face of an outer peripheral portion of the flange and a seal lip projecting from a distal end of the annular groove such that a seal lip clamping portion of the clamp is fitted into the annular groove, the grommet body comprising: an outer peripheral wall which extends axially from an outer peripheral edge of the flange; and a wall portion which is bent radially inwardly from a distal end of the the outer peripheral wall such that the annular groove is defined by the flange, the outer peripheral wall and the wall portion; the seal lip projecting from a distal end of the wall portion; the flange having a large thickness, while the outer peripheral wall has a thickness smaller than that of the flange; wherein when the seal lip has been turned up over the flange, the flange acts as a stopper for maintaining a state in which the seal lip has been turned up over the flange.

5 Claims, 5 Drawing Sheets

GROMMET

BACKGROUND OF THE INVENTION

The present invention generally relates to a grommet for not only protecting a wire bundle inserted through a hole of a body of a motor vehicle but imparting waterproofness to the wire bundle, which is made of an elastic material and more particularly, to a grommet including a grommet body made of an elastic material and a rigid clamp fitted into an annular groove formed in the grommet body, in which shape of the grommet body is improved such that the clamp can be easily fitted into the annular groove.

Conventionally, grommets of this kind are generally made of an elastic material such as rubber in view of protection and waterproofness of the wire bundle. However, the grommets formed only by rubber have such a drawback in that it is difficult to mount the grommets on a vehicle body. In order to eliminate this drawback, a grommet was proposed in which a rigid clamp made of synthetic resin is fitted into a grommet body made of rubber such that the grommet is mounted on the vehicle body by using the clamp.

For example, FIG. 1 shows a known grommet including a grommet body 2 made of rubber and a clamp 3 made of synthetic resin. In the grommet body 2, a cylindrical portion 2a receiving closely an outer periphery of a wire bundle 1, a radially outwardly extending flange 2b disposed at one end of the grommet body 2, an annular groove 2c formed on an inner face of an outer peripheral portion of the flange 2b and a seal lip 2d projecting from a distal end of the annular groove 2c are formed integrally. On the other hand, in the clamp 3, a cylindrical portion 3a having an inside diameter larger than an outside diameter of the wire bundle 1, a disklike seal lip clamping portion 3b extending radially outwardly from one end of an outer periphery of the cylindrical portion 3a, a mounting portion 3c extending radially outwardly from the other end of the outer periphery of the cylindrical portion 3a and a contact portion 3d disposed on the mounting portion 3c are formed by integral molding. The seal lip clamping portion 3b of the clamp 3 is fitted into the annular groove 2c of the grommet body 2 such that the clamp 3 is mounted on the grommet body 2. The seal lip 2d of the grommet body 2 is pressed against an outer side face of a wall 4 of a vehicle body, while the mounting portion 3c of the clamp 3 is fitted into a hole 4a of the wall 4 so as to bring the contact portion 3d of the clamp 3 into contact with an inner side face of the wall 4 such that the clamp 3, i.e., the known grommet is mounted on the wall 4.

As shown in FIG. 2, if the seal lip 2d can be returned in the direction of the arrow X2 in a state in which the entire seal lip 2d is turned up in the direction of the arrow X1 such that the seal lip clamping portion 3b of the clamp 3 is pressed against an inner side face 2b' of the flange 2b, the seal lip clamping portion 3b of the clamp 3 can be easily fitted into the annular groove 2c of the grommet body 2.

However, in the known grommet, a tension of the rubber forming the grommet body 2 is large. Therefore, even if the entire seal lip 2d is turned up in the direction of the arrow X1, the seal lip 2 readily returns to the original state. Accordingly, the seal lip clamping portion 3b is fitted into the the annular groove 2c while the seal lip 2d is being partially turned up in the direction of the arrow X1. Consequently, working efficiency of operation of mounting the clamp 3 on the grommet body 2 is poor and thus, a long time period is required for performing the operation.

The present inventors have found that the above mentioned problem of the known grommet, wherein the seal lip 2d returns to the original state by its tension even if the seal lip 2d is turned up, is incurred by the construction of the grommet body 2 in which the flange 2b is formed by a thin wall, an outer peripheral wall 2e of the flange 2b is formed by a thick wall and an outer peripheral face 2f of a bent portion connecting the flange 2b and the outer peripheral wall 2e has a large radius of curvature.

SUMMARY OF THE INVENTION

Accordingly, an essential object of the present invention is to provide a grommet in which the shape of a grommet body is improved so as to enable holding of a state wherein an entire seal lip has been turned up such that a clamp can be properly and efficiently fitted into the grommet body.

In order to accomplish this object of the present invention, a grommet according to the present invention includes a grommet body made of an elastic material and a clamp, the grommet body having a cylindrical portion for closely receiving an outer periphery of a wire bundle, a flange provided at one end of the cylindrical portion, an annular groove formed on an inner face of an outer peripheral portion of the flange and a seal lip projecting from a distal end of the annular groove such that a seal lip clamping portion of the clamp is fitted into the annular groove, the grommet body comprising: an outer peripheral wall which extends axially from an outer peripheral edge of the flange; and a wall portion which is bent radially inwardly from a distal end of the the outer peripheral wall such that the annular groove is defined by the flange, the outer peripheral wall and the wall portion; the seal lip projecting from a distal end of the wall portion; the flange having a large thickness, while the outer peripheral wall has a thickness smaller than that of the flange; wherein when the seal lip has been turned up over the flange, the flange acts as a stopper for maintaining a state in which the seal lip has been turned up over the flange.

In the grommet of the present invention, the grommet body has a bent portion connecting the flange and the outer peripheral wall and an outer face of the bent portion is so formed as to retain the seal lip in a state in which the entire seal lip has been turned up over the flange. To this end, it is preferable that the bent portion has a small radius of curvature or a substantially orthogonal shape.

Accordingly, in the grommet of the present invention, the flange has a large thickness so as to increase its strength, while the outer peripheral wall which encloses the annular groove and is turned over together with the seal lip has a small thickness so as to reduce tension of the outer peripheral wall. The flange has a large thickness as described above. Therefore, when the seal lip has been turned up over the flange, the flange acts as a stopper for maintaining a state in which a whole of the seal lip has been turned up over the flange.

Consequently, if the clamp is brought into contact with an inner face of the flange in the state in which the entire seal lip has been turned up over the flange and then, the seal lip is returned to the original position, the seal lip clamping portion of the clamp can be fitted into the annular groove of the grommet body quite simply.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
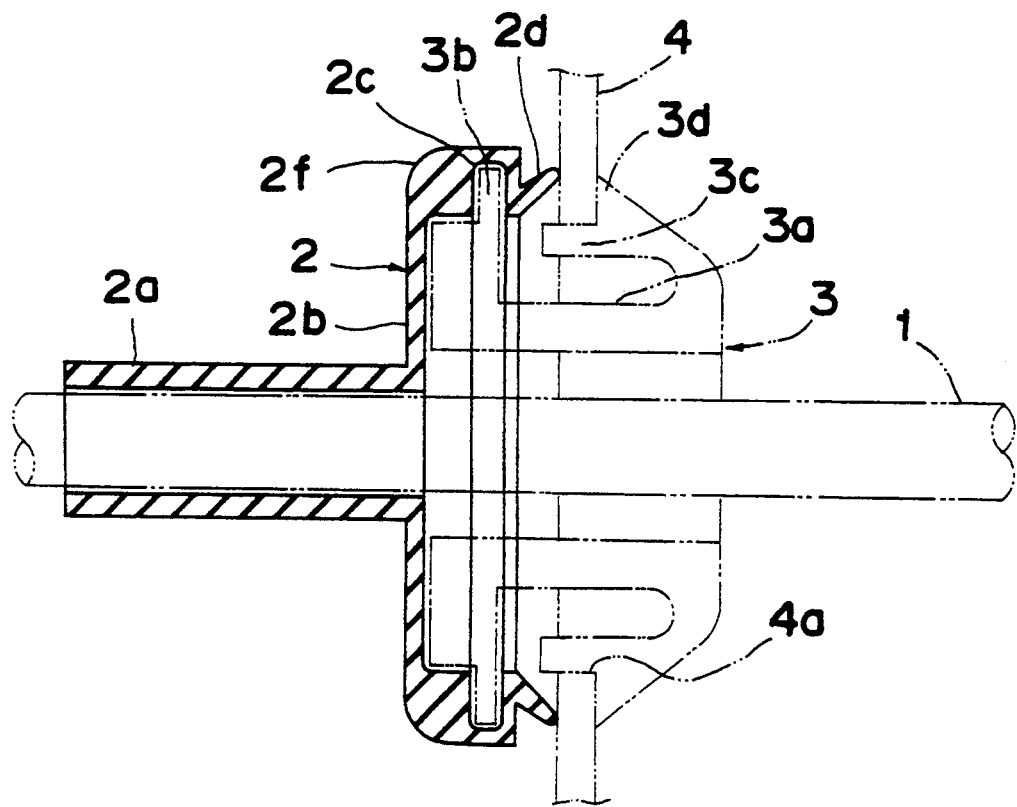
FIG. 1 is a sectional view of a prior art grommet (already referred to)
Figure 2:
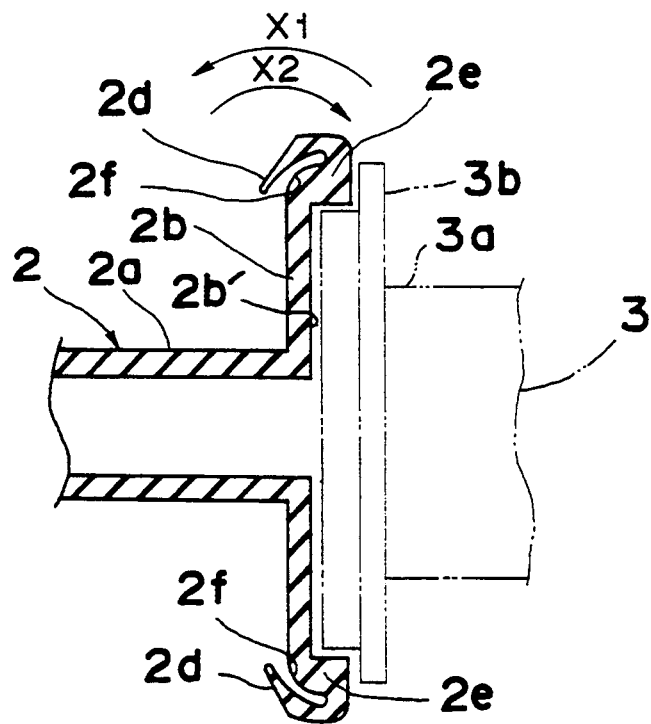
FIG. 2 is a sectional view showing a problem in the prior art grommet of FIG. 1 (already referred to)
Figure 3:
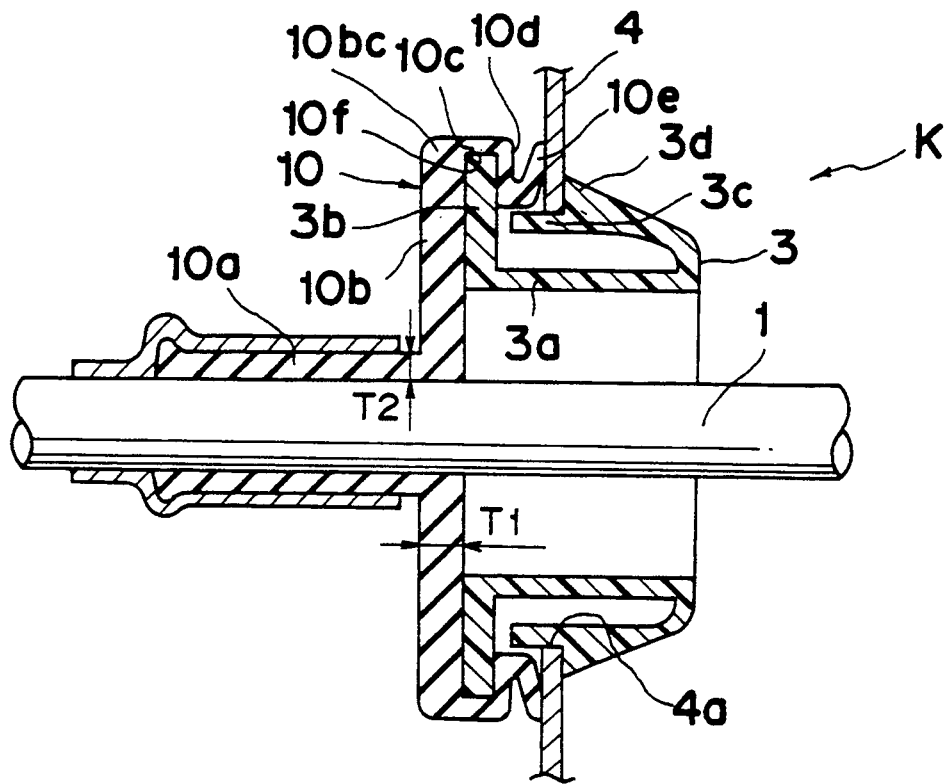
FIG. 3 is a sectional view of a grommet according to one embodiment of the present invention.

Referring now the drawings, there is shown in FIGS. 3 to 6, a grommet K according to one embodiment of the present invention. The grommet K includes a grommet body 10 made of rubber and a rigid clamp 3 made of synthetic resin. In the grommet body 10, a cylindrical portion 10a for receiving closely an outer periphery of a wire bundle 1, a flange 10b extending radially outwardly from one end of the cylindrical portion 10a, an outer peripheral wall 10c extending axially from an outer peripheral edge of the flange portion 10b in a direction away from the cylindrical portion 10a, a wall portion 10d extending radially inwardly from a distal end of the outer peripheral wall 10c and a seal lip 10e projecting from a distal end of the wall portion 10d are formed integrally. An annular groove 10f is formed on an inner face of an outer peripheral portion of the flange 10b so as to be enclosed by the flange 10b, the outer peripheral wall 10c and the wall portion 10d.

On the other hand, the clamp 3 has constructions similar to those of the clamp 3 of a prior art grommet of FIG. 1. Namely, in the clamp 3, a cylindrical portion 3a having an inside diameter larger than an outside diameter of the wire bundle 1, a disklike seal lip clamping portion 3b extending radially outwardly from one end of an outer periphery of the cylindrical portion 3a, a mounting portion 3c extending radially outwardly from the other end of the outer periphery of the cylindrical portion 3a and a contact portion 3d disposed on the mounting portion 3c are formed by integral molding. The seal lip clamping portion 3b of the clamp 3 is fitted into the annular groove 10f of the grommet body 10 such that the clamp 3 is mounted on the grommet body 10. The seal lip 10e of the grommet body 10 is pressed against an outer side face of a wall 4 of a vehicle body, while the mounting portion 3c of the clamp 3 is fitted into a hole 4a of the wall 4 so as to bring the contact portion 3d of the clamp 3 into contact with an inner side face of the wall 4 such that the clamp 3, i.e., the grommet K is mounted on the wall 4.

More specifically, in the grommet body 10, a thickness T1 of the flange 10b is larger than a thickness T2 of the cylindrical portion 10a and is far larger than a thickness T3 of the outer peripheral wall 10c. In this embodiment, the thickness T1 is about four times the thickness T3 of the outer peripheral wall 10c, namely, $T1 \simeq 4 \times T3$. A thickness T4 of the wall portion 10d is larger than the thickness T3 of the outer peripheral wall 10c but is smaller than the thickness T1 of the flange 10b. In this embodiment, the thickness T4 of the wall portion 10d is about twice the thickness T3 of the outer peripheral wall 10c, namely, $T4 \simeq 2 \times T3$.

Figure 4:
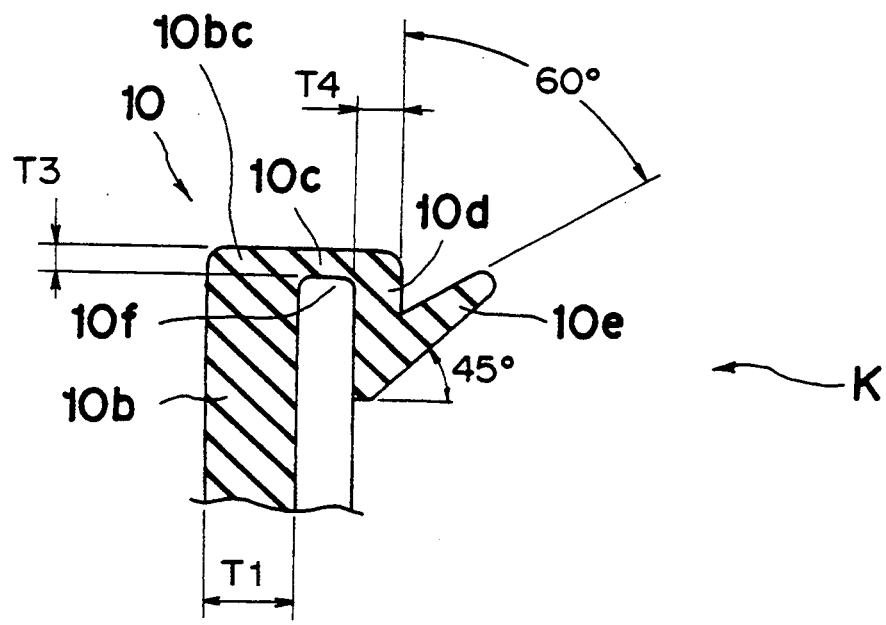
FIG. 4 is an enlarged fragmentary sectional view of the grommet of FIG. 3.
Figure 5:
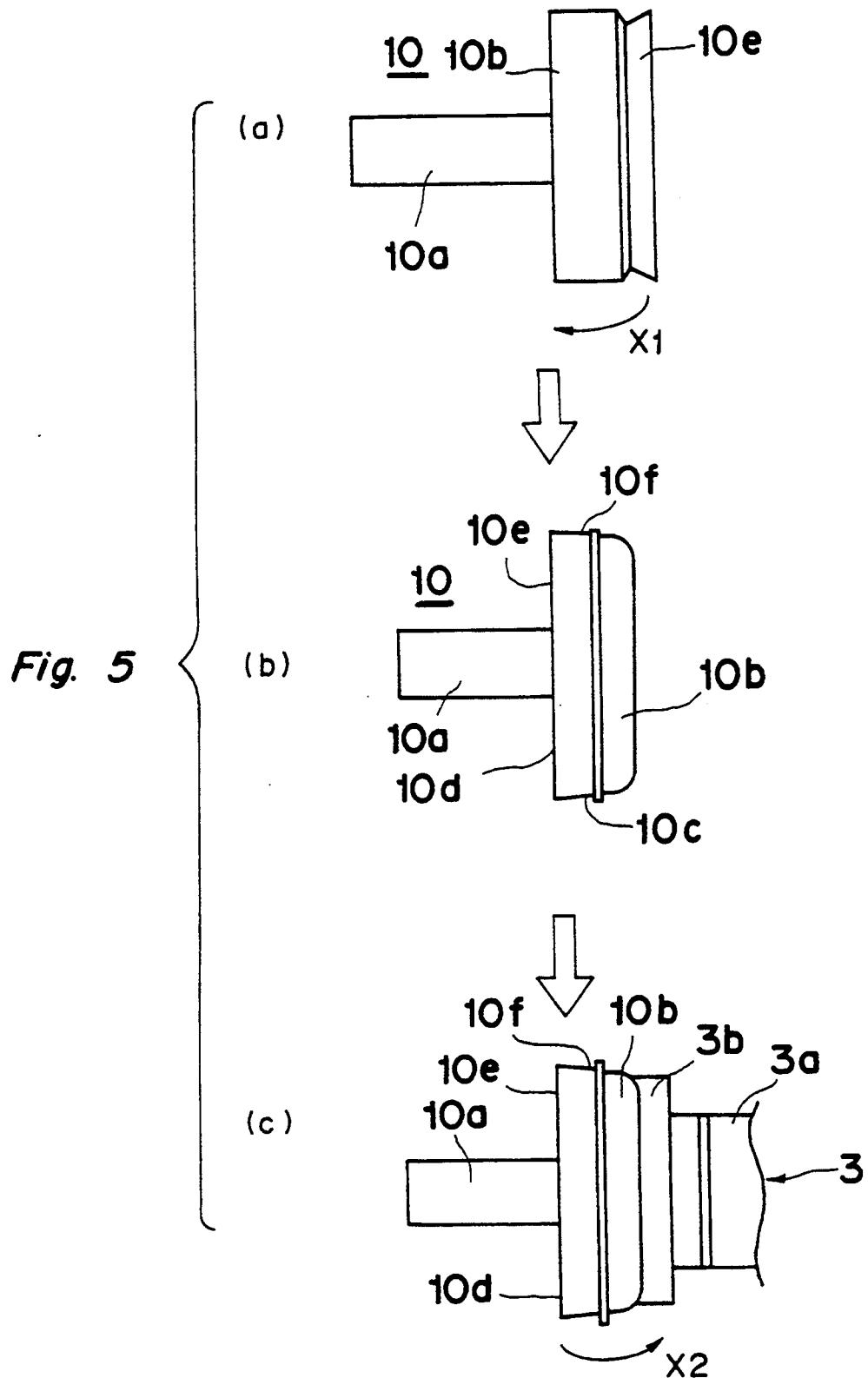
FIGS. 5(a), 5(b) and 5(c) are views indicative of steps of mounting a clamp on a grommet body in the grommet of FIG. 3.

Meanwhile, in the grommet body 10, both an outer peripheral face and an inner peripheral face of a bent portion 10bc connecting the flange 10b and the outer peripheral wall 10c are bent substantially orthogonally. As shown in FIG. 4, the seal lip 10e projecting from the wall portion 10d has an outer face inclined at an angle of about 60° relative to the wall portion 10d, while an inner face of the seal lip 10e is inclined at an angle of about 45° relative to the axis of the grommet body 10. The seal lip 10e is so formed as to become gradually thinner towards its rounded distal end.

Figure 6:
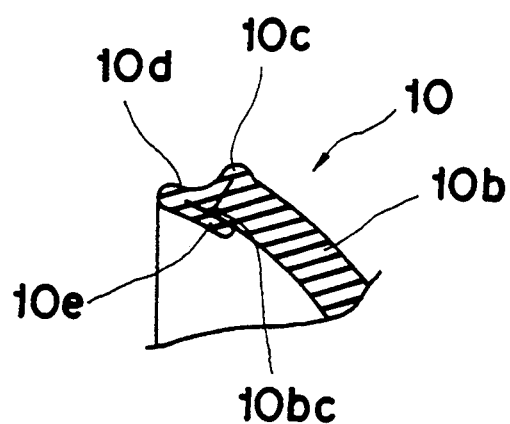
FIG. 6 is an enlarged fragmentary sectional view of FIG. 5(b).

When the seal lip clamping portion 3b of the clamp 3 is fitted into the annular groove 10f of the grommet body 10, the entire seal lip 10e of the grommet body 10 in its original state is initially turned up in the direction of the arrow X1 as shown in FIG. 5(a). As a result, the grommet body 10 is set in a state shown in FIG. 5(b) such that an inner face of the flange 10b is exposed outwardly. The grommet body 10 is held in this state without return of the seal lip 10e to the original state. Meanwhile, at this time, the flange 10b is turned up towards the cylindrical portion 10a as shown in FIG. 6. Subsequently, the seal lip clamping portion 3b of the clamp 3 is pressed against the inner face of the flange 10b as shown in FIG. 5(c) and then, the seal lip 10e of the grommet body 10 is returned to the original state in the direction of the arrow X2. Thus, fitting of the seal lip clamping portion 3b of the clamp 3 into the annular groove 10f of the grommet body 10 is completed.

As is clear from the foregoing description of the grommet of the present invention, the thickness T1 of the flange is large, while the thickness T3 of the outer peripheral wall which encloses the annular groove and is turned up together with the seal lip is small. Therefore, when the entire seal lip has been turned up over the flange, the flange having the large thickness acts as a stopper for maintaining the state in which the entire seal lip has been turned up over the flange. At this time, since the bent portion connecting the flange and the outer peripheral wall has an orthogonal shape or a small radius of curvature so as to retain the seal lip, the state in which the seal lip has been turned up over the flange can be maintained more positively.

As described above, if the seal lip is retained by the thick flange in the state where the entire seal lip has been turned up over the flange, the clamp is pressed against the flange and then, the seal lip is returned to the original state, the seal lip of the clamp can be fitted into the annular groove of the grommet body quite simply.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A grommet which includes a grommet body made of an elastic material and a clamp, the grommet body having a cylindrical portion for closely receiving an outer periphery of a wire bundle, a flange provided at one end of the cylindrical portion, an annular groove formed on an inner face of an outer peripheral portion of the flange and a seal lip projecting from a distal end of the annular groove such that a seal lip clamping portion of the clamp is fitted into the annular groove, the grommet body comprising:

an outer peripheral wall which extends axially from an outer peripheral edge of the flange;

a wall portion which is bent radially inwardly from a distal end of the outer peripheral wall such that the annular groove is defined by the flange, the outer peripheral wall and the wall portion, the seal lip projecting from a distal end of the wall portion; and means for maintaining the seal lip in a state in which the seal lip is turned up over the flange so as to be inside out, said maintaining means comprising the flange and the outer peripheral wall, the flange having a large thickness, while the outer peripheral wall has a thickness smaller than that of the flange.

2. A grommet as claimed in claim 1, wherein the maintaining means further comprises a bent portion connecting the flange and the outer peripheral wall, and wherein an outer face of the bent portion is so formed as to retain the seal lip in the state in which the seal lip is turned up over the flange.

3. A grommet as claimed in claim 2, wherein the outer face of the bent portion has a substantially orthogonal shape.

4. A grommet as claimed in claim 1, wherein the clamp is made of a rigid material.

5. A grommet as claimed in claim 4, wherein the elastic material of the grommet body is rubber and the rigid material of the clamp is synthetic resin.

* * * * *